Figure 1:
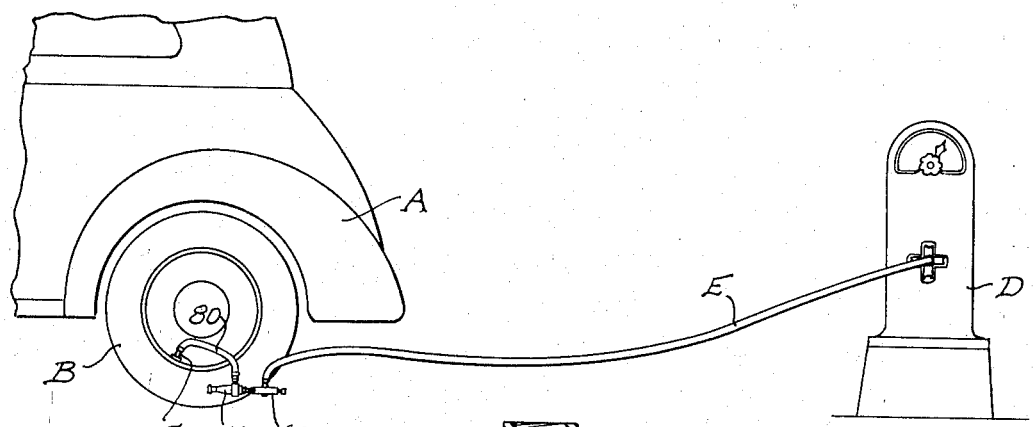

Sept. 26, 1944.  W. E. SHERBONDY  2,359,162

TIRE DEFLATING DEVICE

Filed Oct. 24, 1940

INVENTOR.

Wm. E. Sherbondy,
BY Bates, Teare & McBean,
Attorneys.

Patented Sept. 26, 1944

2,359,162

UNITED STATES PATENT OFFICE 2,359,162

TIRE DEFLATING DEVICE

William E. Sherbondy, Shaker Heights, Ohio

Application October 24, 1940, Serial No. 362,554

6 Claims. (Cl. 226—20.4)

This invention relates to a simple and efficient device for rapidly extracting the air from the inner tube of an automobile tire. At present, when it is desired to change an automobile tire, it is the custom to remove the valve plug and allow the pressure in the tube to force out the air until it drops to atmospheric pressure. Sometimes this is hastened by allowing the weight of the car to bear down on the casing, but in any event there is considerable time wasted in deflating the tube before the tire can be removed.

The deflation is especially troublesome in tires of the "Lifeguard" type, which have an additional tube within the main inner tube and communicating with it only by a small opening, through the wall of the additional tube, which is not accessible in any manner from the exterior. In such tires there is a very decided delay while the air within the innermost section of the tube gradually seeps out through the diminutive opening into the outer section and thence out through the inflating nipple.

By my invention, I provide an ejecting device adapted to be coupled to the tire nipple and also to the hose line delivering air under pressure and I use the force of the air under pressure to draw out the air from within the tube to produce substantially a vacuum therein.

More particularly, I have provided a casing with a hose connection adapted to be coupled to the tire nipple, the casing having a discharge nozzle and there being also a high pressure nozzle terminating adjacent the discharge nozzle and coupled by a suitable clamp to a hose from the air pressure device. In using my device, it is only necessary to remove the tire valve from the tire nipple; screw on the head of the hose connection to the ejector, and clamp the discharge head from the air pressure line in position to supply the ejecting tube with compressed air. Then the compressed air, rushing through the ejecting tube, draws out the surrounding air in the casing creating a region of reduced pressure in communication with the tire which very rapidly draws out the air from the interior of the tire tube.

My invention is hereinafter more fully described in connection with a preferred embodiment illustrated in the drawing, and the essential novel features are summarized in the claims.

Figure 2:
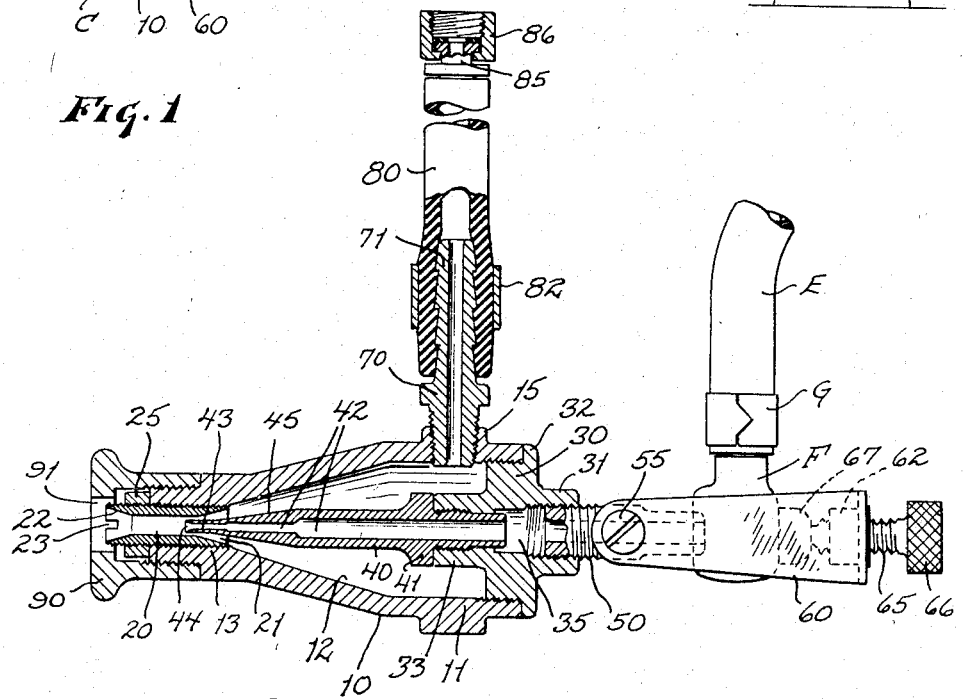
Figure 4:
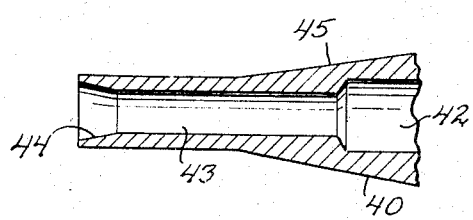
Figure 3:
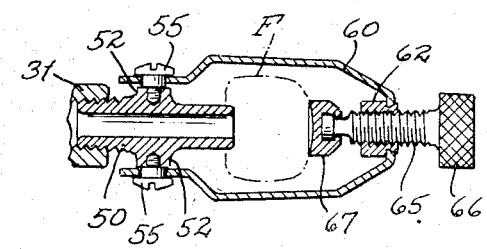

In the drawing, Fig. 1 is a view, in side elevation, illustrating my ejecting device coupled to a rear tire of an automobile and to a tire inflating hose in communication with an air compressor; Fig. 2 is an axial section of the deflating device itself; Fig. 3 is a detail of the clamp for the compressed air hose, being an axial section in a plane at right angles in Fig. 2; Fig. 4 is an enlarged section of the high pressure nozzle of the device.

As shown in Fig. 2, 10 indicates a hollow casing or barrel of a form which is substantially cylindrical near one end (indicated at 11) and then tapers down by a conical portion 12 to an internally threaded cylindrical portion 13. Threaded within the cylindrical portion 13 is a tubular discharge nozzle 20, which is externally threaded throughout its length to screw into the internal thread of the casing.

The nozzle 20 is externally a threaded cylinder and internally has a cylindrical bore terminating in conical portions 21 and 22. The outer end is preferably provided with a screw driver slot 23 by which it may be readily turned into place or adjusted in position. It is clamped in selected position by a clamping nut 25 screwing onto the external thread and bearing against the end of the barrel 10.

The other end 11 of the barrel is closed by a plug 30 which carries a high pressure conduit leading axially from the exterior through the plug and discharging at a point within the discharge nozzle. The plug and high pressure conduit could be one integral member but I prefer to make them separate parts as follows:

The plug preferably screws into the barrel (being readily turned by a wrench applied to the angular exterior of a tubular boss 31), and has a flange 32 abutting the end of the barrel. The plug is provided with a tubular interior boss 33 communicating through a bore 35 with the bore of the boss 31. An internal high-pressure tube 40 screws into the boss 33 and has a shoulder abutting the end of the boss. This shoulder is provided by an angular enlargement 41 by which the tube may be turned tightly into place. The admission to this tube is effected by an external tubular fitting 50 screwing into the external boss 31.

The tube 40 has a bore extending from one end to the other having a comparatively large cylindrical portion 42 at the entrance and a smaller cylindrical portion 43 terminating in a flaring or conical portion 44 at the discharge end. This tube extends just within the nozzle 20, as shown in Fig. 2, but leaves an annular space between its exterior and the interior of the nozzle 20.

The fitting 50 which screws into the angular boss 31 on the exterior of the plug 30 has a bore extending completely through it and communicating with the bore 35 of the plug. The outer end of the fitting is rounded on the end and it is commensurate in size with the ordinary tire filling nipple, so that it may readily coact with the usual head on a tire-filling air hose. To simplify the construction and avoid the necessity of a jam nut, I prefer to taper the threads of the fitting 50.

The fitting 50 is provided on its opposite side with bosses 52 to which are pivotally secured the arms of the U-shaped yoke or stirrup 60. The pivoting is readily effected by screws 55 passing freely through the arms of the yoke into the bosses 52. At its central portion the yoke carries a nut 62 in which is threaded a screw 65 having a knurled outer end 66 and swivelly connected to a pad 67 at its inner end. The clamping device is accordingly well adapted to clamp the head of the pressure hose against the end of the fitting 50 and thus supply compressed air to the interior of the tube 40.

The interior of the barrel 10 is connected to the nipple of the tire tube to be deflated. To effect this, I provide a screw threaded boss 15 on the exterior of the casing and into an opening extending through this boss to the interior I screw the nipple 70, which preferably has a tapered thread. This nipple is formed on its exterior with a roughened portion 71 on which is tightly clamped a short hose 80 which may be of rubber. As shown, a suitable embracing band 82 may clamp the hose on the nipple 70. At its other end the hose terminates in a tubular head 85 on which is swiveled an internally threaded sleeve 86 adapted to screw onto the tire nipple.

The use of my device is illustrated in Fig. 1, where A indicates an automobile, B the tire thereof, and C the ordinary filling nipple from the inner tube of the tire. D indicates a tower in communication with an air compressor and having a compressed air hose E, such as ordinarily used at filling stations for inflating tires. This hose terminates in a head F, the shank of which is clamped within the hose by a collar G. The valve plug is removed from the tire nipple and the head 86 is screwed onto such nipple, and the head F of the inflating hose is placed against the end of the fitting 50 and clamped by turning in the screw 65.

When the device is attached as described, compressed air under comparatively high pressure from the hose E and the head F rushes through the fitting 50 and the high pressure tube 40 and as this air enters the low pressure nozzle 20 it draws with it an annular stream of air surrounding the high pressure nozzle, thus evacuating the barrel. The vacuum, or reduced pressure, thus produced in the barrel and hose 80 instantly draws the air out of the inner tube of the tire. As the air in such tube between the nipple and diaphragm is thus exhausted, the air on the other side of the diaphragm rapidly forces itself through the small opening into the nipple-carrying portion of the tube, with the result that all of the air within the tube is rapidly exhausted, leaving the tire ready for removal as soon as the head 86 is unscrewed from the tire nipple.

To prevent injury to the projecting portion of the discharge nozzle 20 I prefer to provide a tubular cap 90 which loosely surrounds the clamping nut 25 and screws onto a reduced externally threaded end of the barrel, as shown in Fig. 2. This cap has a comparatively large opening 91 opposite the end of the discharge nozzle, so that it has no effect on the discharging air though it does serve as a mechanical protection from injury to the threaded discharge nozzle.

The flare 44 in the end of the high pressure tube serves to direct the discharging air outwardly against the wall of the adjustable tubular nozzle 20, where it effectively engages the annular stream of low pressure air about the tube. By reason of the gradual increase in the external diameter of the high pressure tube, as indicated at 45, the effective annular passage-way becomes reduced as the flaring admission end of the nozzle 20 is forced inwardly by screwing such nozzle into the barrel. Accordingly, the shifting of the nozzle 20 in or out varies the size of the annular passage-way, enabling this passage-way to be accurately adjusted with reference to the discharge of high pressure air, to cause the most efficient suction action on the interior of the barrel and hence in the conduit 80 and tire tube.

It will be seen that my device has comparatively few parts, and may be cheaply constructed, and when not in use occupies only a small space. It may be attached very quickly to the tire nipple and to the usual air hose at a filling station. My experience has demonstrated that in use the device effects the exhaustion of even the large tire of the "Lifeguard" type in a very short time—a time measured in seconds rather than in minutes or fractions of an hour, as has been heretofore experienced.

I claim:

1. Means for exhausting air from the inner tube of a tire comprising an ejection device having two passageways discharging adjacent each other, and means for removably coupling one passageway with the filling nipple of the tire tube and means for removably coupling the other passageway with a fluid supply, whereby the fluid discharged through the device from the fluid supply may draw out the air from the interior of the tube.

2. The combination of a hollow casing having a discharge nozzle, a high pressure conduit extending from the exterior into the casing and terminating within the discharge nozzle while leaving an annular space between them, a flexible conduit communicating with the interior of the casing and formed at its free end with means for coupling it to the nipple of the tire tube, and a clamping device adapted to engage such head on an air hose as is suitable for direct coaction with said tire nipple and hold said head in position to communicate with the internal conduit.

3. An ejecting device comprising a hollow casing having a discharge nozzle, a high pressure conduit extending from the exterior into the casing and terminating adjacent the discharge nozzle while leaving a space between them in communication with the interior of the casing, a nipple projecting externally from the casing and in communication with its interior, a flexible conduit on said nipple having means at the free end thereof adapted for attachment of a nipple of a tire tube, and a clamp mounted on the ejecting device and adapted to hold such head of a compressed air hose as is suitable for direct coaction with said tire nipple in position to communicate with the high pressure conduit of the ejecting device.

4. In a device of the character described, the combination of a hollow casing having a discharge orifice and having an admission opening, a conduit to connect the admission opening with a tire nipple, a high pressure tube within the casing terminating adjacent the discharge opening of the casing, said tube communicating with an externally projecting intake conduit, and a clamp mounted on the device comprising a member adapted to extend about such head on a compressed air hose as is suitable for direct coaction with said tire nipple and having means for forcing such head against the intake conduit.

5. In a device of the character described, the combination of a tubular casing open at opposite ends, one end being materially larger than the other so that the casing is constricted toward the smaller end, a nozzle adjustably mounted in the smaller end of the casing, a plug mounted on the casing at its larger end, a high pressure tube carried by the plug extending axially of the casing and terminating adjacent the nozzle, an intake tube secured to the plug and extending outwardly therefrom, a loop pivotally connected to opposite sides of the intake tube, a screw adjustably mounted in the loop and adapted to be forced inwardly toward the intake tube, and a nipple carried by the wall of the tubular casing and projecting externally therefrom and in communication therewith, a hose attached at one end to the nipple and an internally threaded sleeve on the other end of the hose.

6. Means for exhausting the air from the inner tube of an automobile tire through its tire nipple comprising an ejection device having an intake orifice for high pressure air and a suction orifice, the wall surrounding the intake orifice corresponding in size to the wall surrounding the orifice of said tire nipple and the wall surrounding the suction orifice comprising an internally threaded sleeve adapted to screw onto said tire nipple and a clamp carried by the ejection device and adapted to engage the head of a filling hose formed to fit said nipple and hold said head in registration with the intake orifice of the ejection device.

WILLIAM E. SHERBONDY.